United States Patent [19]

Chilvers

[11] 4,249,160
[45] Feb. 3, 1981

[54] VEHICLE MOUNTED LIGHT ACTIVATED CONTROL SYSTEM

[76] Inventor: Graham R. Chilvers, 29 Higher Audley Ave., Torquay, Devon, England

[21] Appl. No.: 909,816

[22] Filed: May 26, 1978

Related U.S. Application Data

[63] Continuation-in-part of Ser. No. 775,597, Mar. 8, 1977, abandoned.

[30] Foreign Application Priority Data

Nov. 21, 1975 [GB] United Kingdom ............... 48023/75
Jan. 5, 1976 [GB] United Kingdom .................. 193/76
Jul. 21, 1976 [GB] United Kingdom ............... 30261/76
Oct. 19, 1977 [GB] United Kingdom ............... 53562/77

[51] Int. Cl.$^2$ ............................ G08G 1/00; B60Q 1/26
[52] U.S. Cl. ..................................... 340/33; 250/206; 250/215; 307/10 LS; 315/82; 315/134; 315/157; 315/159; 340/31 R; 340/53
[58] Field of Search ............... 340/32, 31 R, 33, 34, 340/53, 51, 134; 315/82, 83, 149, 159, 157, 156, 134; 307/10 LS; 250/206, 215

[56] References Cited

U.S. PATENT DOCUMENTS

| | | | |
|---|---|---|---|
| 3,037,144 | 5/1962 | La Mantia | 315/82 |
| 3,211,951 | 10/1965 | Skinner et al. | 315/82 |
| 3,399,378 | 8/1968 | Carter et al. | 340/34 |
| 3,665,224 | 5/1972 | Kelsey | 250/215 |
| 3,683,379 | 8/1972 | Saddler et al. | 340/33 |
| 3,790,848 | 2/1974 | Lai | 315/155 |
| 3,793,621 | 2/1974 | McIntosh | 340/53 |
| 4,093,937 | 6/1978 | Habinger | 250/215 |
| 4,117,453 | 9/1978 | Hodgson et al. | 315/83 |
| 4,117,457 | 9/1978 | Latta | 315/149 |

FOREIGN PATENT DOCUMENTS 336712 10/1930 United Kingdom .
1278836 6/1972 United Kingdom .

*Primary Examiner*—John W. Caldwell, Sr.
*Assistant Examiner*—James J. Groody
*Attorney, Agent, or Firm*—Cushman, Darby & Cushman

[57] ABSTRACT

A light activated control system, particularly for operating warning lights on a vehicle parked at night. The system includes a light sensor mounted on the vehicle and a comparator which triggers a time delay threshold device which switches on the warning lights for a predetermined period of about ten seconds only when the sensed light intensity increases through a threshold level due for example to the approach of a lighted vehicle. The system may alternatively be responsive to the rate of increase of sensed light level to switch on the warning lights.

4 Claims, 5 Drawing Figures

VEHICLE MOUNTED LIGHT ACTIVATED CONTROL SYSTEM

This application is a continuation-in-part of Application Ser. No. 775,597 filed Mar. 8, 1977 now abandoned.

BACKGROUND TO THE INVENTION

The present invention relates to a vehicle-mounted light activated control system, particularly, but not exclusively, for use in vehicles to control a warning device.

At present there is no legal obligation in many countries to provide warning lights for vehicles parked at night in built-up areas, despite the fact that street lighting, especially in minor roads, is often insufficient and visibility is often reduced temporarily, even in major roads by, for example, bad weather conditions or headlight glare from oncoming vehicles. This results in a number of accidents due to vehicles colliding at night with unlit parked vehicles.

At present vehicle owners are reluctant to light parked vehicles overnight since the only effective method is to leave the sidelights on, with consequent drain on the battery. An object of the present invention is to provide a light activated control system which will operate a warning device, such as the sidelights of a stationary vehicle, only in response to a change in light level, for example due to the light from headlights of an approaching vehicle.

SUMMARY OF THE INVENTION

According to a broad aspect of the present invention there is provided a vehicle-mounted light-activated control system comprising: a comparator circuit having first and second inputs; photoelectric ambient light sensing means connected to the first comparator input; reference voltage means defining a reference voltage level and connected to the second input of the comparator circuit, said reference level corresponding to a threshold light intensity at the sensing means; a capacitive shunt connected to the first comparator input to exclude from said first input transient signals from said sensing means due to rapid changes in ambient light level at alternating current mains frequency and higher frequencies; a time delay device connected to the comparator circuit for timing a predetermined time interval; triggering means connected to the time delay device, and warning means connected to and controlled by the triggering means, whereby the warning means are triggered into operation by the triggering means for said predetermined time interval timed by the time delay device when the light intensity sensed by the sensing means increases through said threshold light intensity to cause operation of the time delay device by the comparator circuit.

In use of the invention to control a warning device on a parked vehicle at night the light sensing means may include a sensor or sensors at the rear of the vehicle, the control system being connected to operate a visual warning device which may, for example, be constituted by the tail lights, brake lights, parking lights, and/or the front side lights of the vehicle, which in this case may constitute the warning device. Preferably a further sensor is provided which can be located at the front of the vehicle and which will trigger the control system independently of the rear sensor or sensors provided the light on each sensor is below the threshold level before triggering of the circuit.

The threshold level is preferably set substantially at that light level below which lights are required for moving vehicles. In operation of the control system, when the ambient light intensity falls below this level, the vehicle's warning lights will remain switched off. If, thereafter, a lighted moving vehicle approaches the parked vehicle and the light falling on one of the sensors rises above the threshold level, the control circuit will be triggered to operate the warning lights for the predetermined time interval. The predetermined time interval is preferably of the order of ten seconds, which is sufficient for a vehicle moving at 30 miles per hour from a position sufficiently close to the parked vehicle for its headlights to activate the control system, to pass the parked vehicle.

At the end of the predetermined time interval the warning lights will automatically be switched off, to be reactivated when another lighted moving vehicle passes the parked vehicle. Even if an approaching vehicle stops near the parked vehicle, with its headlights playing on a sensor, the warning lights will go off after the predetermined time interval and will not be reactivated while the headlights remain on as the control circuit is triggered only by a change in light intensity. The parked vehicle should by then have been noticed and the danger of accidental collision avoided. The control system will also remain inactive if street lights which give sufficient illumination to raise the ambient light level above the threshold level are switched on. Should the street lights later be switched off, for example, in the early hours of the morning, the control system will then be available to activate the warning lights when necessary.

Clearly the use of a system according to the invention should ensure that warning lights are operational at times when they are required, and not for the major part of the night or in well lit areas. Depending on the time interval used, the lights may for example operate for between ten and thirty minutes a night (corresponding to the passage of say sixty to one hundred and eighty cars) which, even considering the additional drain on the battery due to repeated switching of the circuit, should result in a considerable saving of energy over continuous use of the light for between six and twelve hours.

The present control system for warning lights offers a further advantage over continuous warning lights as it has been found that flashing lights are more noticeable to the human brain than continuous lights. The switching on of the vehicle lights on the approach of a motorist thus draws greater attention to the presence of the parked vehicle than would a continuous light. Attention could be further maintained by including a flasher unit in the control system for connection to the vehicle lights, or by connecting the control circuit to a hazard light flasher unit already installed in the vehicle.

In the absence of any modification, a control system according to the invention would operate to activate the warning device, such as the vehicle lights, upon any increase in the ambient light intensity through the threshold level, for example, due to the rising of the sun at dawn. As explained above with reference to street lighting, the warning device will operate only for the predetermined time interval and thereafter, provided the light level remains above the threshold level, the warning device will not be re-activated even on the approach of a lighted vehicle. Should the light level again fall below the threshold level, however, due for example to heavy cloud, the warning lights will operate as described above. The system is therefore automatically rendered inoperative when the ambient light level exceeds the threshold level. Since the control system will activate the warning device only when required, that is, after nightfall, it may be connected to operate permanently, although a master control switch for the circuit may be provided on the dashboard of the vehicle.

In alternative embodiments of the invention, however, control means are provided to prevent triggering of the control circuit in daylight. For example, a further sensor may be provided which is either arranged, in use, to receive light only from the sky, or is sensitive specifically to ultra violet light and is operative to prevent triggering of the control circuit due to an increase in the ambient light level, or specifically of the ultra violet light intensity, respectively, through a respective predetermined level. Alternatively the control means may comprise a circuit operative to detect the rate of increase in light level and to prevent triggering of the warning device unless the rate is greater than a predetermined rate. This predetermined rate would be substantially greater than the rate of increase occurring at sunrise but less than that produced by the approach of a slow moving, lighted vehicle.

An alternative, or additional use of a control system according to the invention would be to operate a dashboard-mounted lamp, or a buzzer located within a vehicle, to provide a warning to the vehicle driver of the desirability of using lights. The system could be set to operate at the same threshold level as the system described above, to be triggered by the lights of approaching vehicles or by street lighting, and it could be arranged to operate only when the lights of the vehicle carrying the system were switched off. No additional warning lamps or buzzers need be provided if the system is arranged to operate the existing lamps in the instrument panel of the vehicle.

In a preferred embodiment of the present invention said light sensing means has an output which in use of the system provides an output signal and said threshold means provide a reference signal and said triggering means comprise a comparator operative to compare said output signal with said reference signal to provide a triggering signal for operation of said time delay device when said output signal has a predetermined relationship to said reference signal, the time delay device, when triggered, operating the warning device for the predetermined time interval.

Preferably the comparator includes a Schmitt trigger. The time delay device may have a resistance-capacitance timing circuit which may be associated with a monostable. Preferably the light sensing means comprise at least one photo-resistive element.

In use of the invention the control circuit may be connected directly to the warning device, or alternatively the control system may include a relay connected to the control circuit and controlling a switch for operating the warning device.

The invention also comprehends a control system as herein described when associated with any suitable warning device, for example vehicle lights, and further comprehends a vehicle equipped with such a system.

According to a further aspect of the invention there is provided a light activated control system, comprising an electronic control circuit for controlling the operation of a warning device and photo-electric light sensing means electrically connected to said control circuit, wherein said control circuit includes:

threshold means for determining a threshold level;
rate determining means for determining a rate of change of light intensity; and
triggering means for triggering said control circuit in use of said control system to operate said warning device in response to an increase in the light intensity sensed by said sensing means beyond said predetermined threshold level at a rate greater than said predetermined rate and to maintain said warning device in operation as long as said sensed light intensity increases at a rate greater than said predetermined rate. The control system may thus be arranged to operate the warning device, for example warning lights on a parked vehicle on the approach of another vehicle, and will continue to operate the lights while the vehicle continues to approach. It will, however, switch the warning lights off if the vehicle stops, or when it passes the parked vehicle. The predetermined rate may conveniently be arranged to be greater than that produced by the sun at dawn.

BRIEF DESCRIPTION OF THE DRAWINGS

One embodiment of the invention will now be more particularly described, by way of example, with reference to the accompanying diagrammatic drawings, in which.

In the drawings the same reference numerals are used to designate the same or corresponding component parts.

DETAILED DESCRIPTION OF THE ILLUSTRATED EMBODIMENTS

Figure 2:
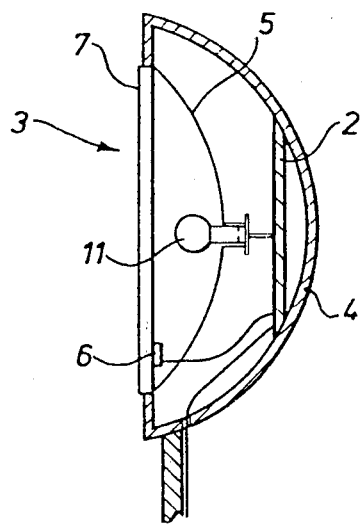
FIG. 2 is a sectional view of a lamp unit fitted with the control system of FIG. 1.

Referring to the drawings, the illustrated light-activated control system for a warning device includes an electronic control circuit, generally indicated 1, the major part of which is carried on a printed circuit board 2 which is shown in FIG. 2 fitted in a lamp unit 3 adapted to be mounted on a vehicle. The circuit board 2 is mounted within a housing 4 and behind a reflector 5 of the lamp unit 3. A photocell 6 forming part of the control system is attached to the rear face of a lens 7 of the lamp unit 3.

Figure 1:
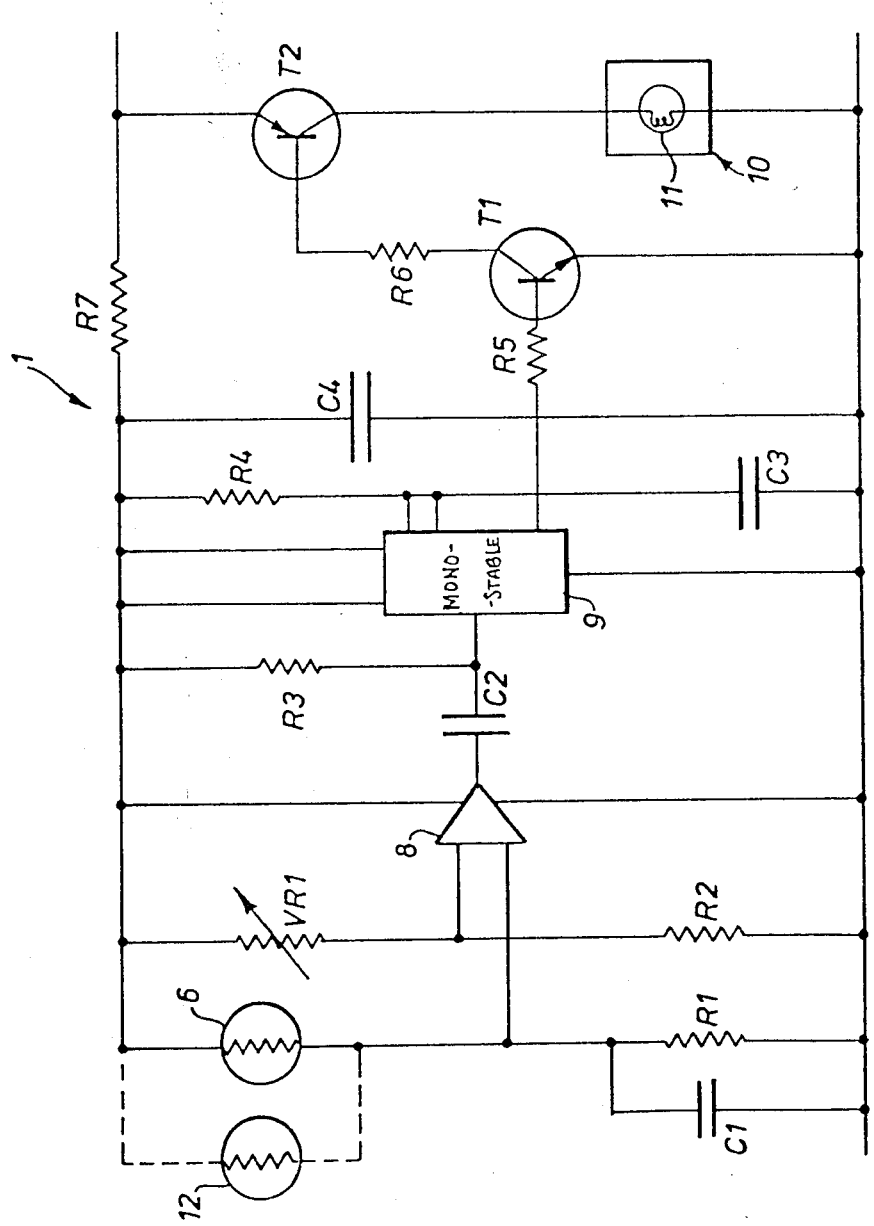
FIG. 1 is a circuit diagram of a control system according to one embodiment of the invention.

Referring to FIG. 1, the photocell 6, which in this example is a photo-resistive element, forms with a resistor R1 part of a potential divider connected across a D.C. supply, in this case the vehicle battery (12 volts). The junction of the photocell 6 and resistor R1 is connected to a first input of a comparator 8. A second input of the comparator 8 is connected to a further potential divider, constituted by a resistor VR1 and a resistor R2 connected in series across the D.C. supply, and arranged to provide a reference voltage level. The resistor VR1 shown in a variable resistor but it may alternatively be a fixed resistor.

The comparator 8 is an operational amplifier, formed by an integrated circuit type 741, which acts as a Schmitt trigger. Thus the comparator 8 provides a steady output voltage at a positive level when the voltage at the first input, derived from the photocell 6, is less than the reference input level, and a steady output voltage at a negative level when the voltage at the first input exceeds the reference input level. The variable resistor VR1 is adjusted so that the reference voltage level balances the first input voltage to the comparator 8 when the photocell 6 is illuminated by a light intensity at a predetermined threshold level.

A capacitor C1 is connected across the resistor R1 to remove from the first comparator input transient signals resulting from intermittent illumination of the photocell 6 by, for example, lightning flashes or alternating current fluorescent street lighting.

The output from the comparator 8 is passed through a capacitor C2 which acts to block direct current to a monostable 9, constituted by an integrated circuit type 555 and to differentiate the output of the comparator 8. The monostable 9 therefore receives an input pulse each time the first input to the comparator 8 passes through the reference level, a negative pulse being received each time the light intensity at the photocell 6 increases through the threshold level, and a positive pulse being received each time the said light level falls through the threshold level.

The monostable 9 responds only to negative pulses, that is pulses due to the output from the comparator 8 changing from positive to negative as a result of an increase in the sensed light intensity through the threshold level. A resistor R3 provides a positive bias voltage at the monostable input to prevent direct current leaking through capacitor C2 and activating the monostable 9 continuously.

The monostable 9 is connected to a timing circuit comprising a resistor R4 and capacitor C3 connected in series across the power supply, the time constant of the circuit R4, C3 determining the interval timed by the monostable 9, that is, the interval between the triggering of the monostable and its reversion to its stable state. The output from the monostable 9 is fed through a resistor R5 which acts as a current limiter to the base of a transistor T1 which acts as an inverter. The transistor T1 controls a switching transistor T2 through a current limiting resistor R6. The collector of the transistor T2 is connected to a warning device 10, in this case constituted by a lamp bulb 11 in the lamp unit 3.

The circuit of FIG. 1 is designed for use with a vehicle having a negative earth or chassis. In the case of a vehicle having a positive earth or chassis the inverter stage T1 would be omitted: to prevent rapid current surges, which could damage the bulb 11, a damping capacitor may be connected between the base of the transistor T1 and earth.

The arrangement described with reference to FIGS. 1 and 2 is a self-contained unit which is responsive to increases in the illumination of the photocell 6 through a threshold level to switch on the lamp bulb 11. This unit may be mounted on a convenient part of a vehicle and connected to the vehicle battery.

Figure 3:
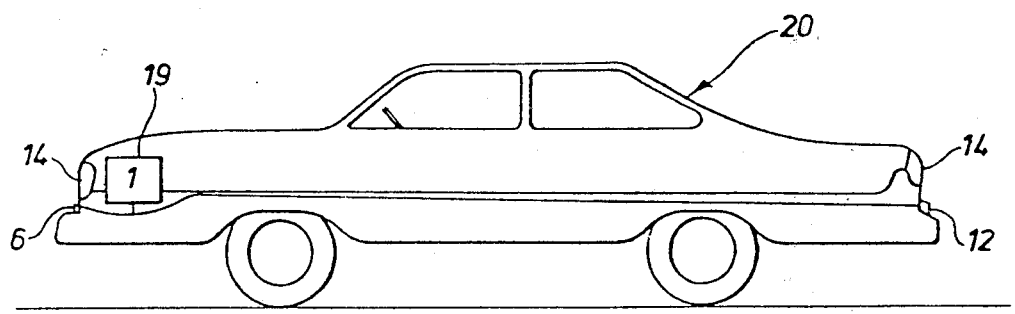
FIG. 3 is a diagrammatic view of an automobile fitted with a control system according to the invention.

In an alternative installation, the lamp unit may comprise a side, head or tail light unit of a vehicle. Alternatively, as shown in FIG. 3, the control circuit 1 is housed in a box 19 which is fitted to an automobile 20 and connected to switch on existing front and rear lamps 14 in response to light sensed by the photocell 6 and a further photocell 12, positioned externally at the front and rear respectively of the automobile 20. As shown in broken outline in FIG. 1, the photocell 12 is connected in parallel with the photocell 6 to the input of the control circuit. The front lamps 14 may be head or side lights and the rear lamps 14 may be tail or brake lights.

A resistor R7 and capacitor C4 are provided in the control circuit 1 to provide alternating current decoupling for any variation in current in the circuit due, for example, to the operation of the flasher unit 18 or the pulsed current to an electric clock.

The bulb 11, particularly for use with commercial vehicles, may be a forty Watt bulb providing much greater illumination than is usual for motor vehicles.

In use of the control system of FIG. 1 the variable resistor VR1 is first set to predetermine the threshold light level for operation of the system.

In operation, light falling on the photocell 6 decreases its resistance, increasing the input voltage at the first input (negative input terminal) of the comparator 8. When this voltage increases from a lower value to equal and then exceed the reference voltage level determined by resistor VR1, the output of the comparator 8 changes from positive to negative and triggers the monostable 9.

The monostable 9, through the transistors T1 and T2, switches on the warning device 10, for example the bulb 11, for the period predetermined by the timing circuit constituted by the resistor R4 and capacitor C3.

The warning device remains switched on for the full length of the predetermined period, typically ten seconds, irrespective of whether or not the photocell 6 continues to receive the increased light intensity which triggered the system. At the end of this period the monostable 9 reverts to its stable state and switches the warning device 10 off.

When the light intensity received by the photocell 6 drops from a higher to a lower level, through the threshold level at which the input voltages to the input terminals of the comparator 8 are the same, the monostable 9, being positively biased, is not triggered and the warning device is not switched on.

Figure 4:
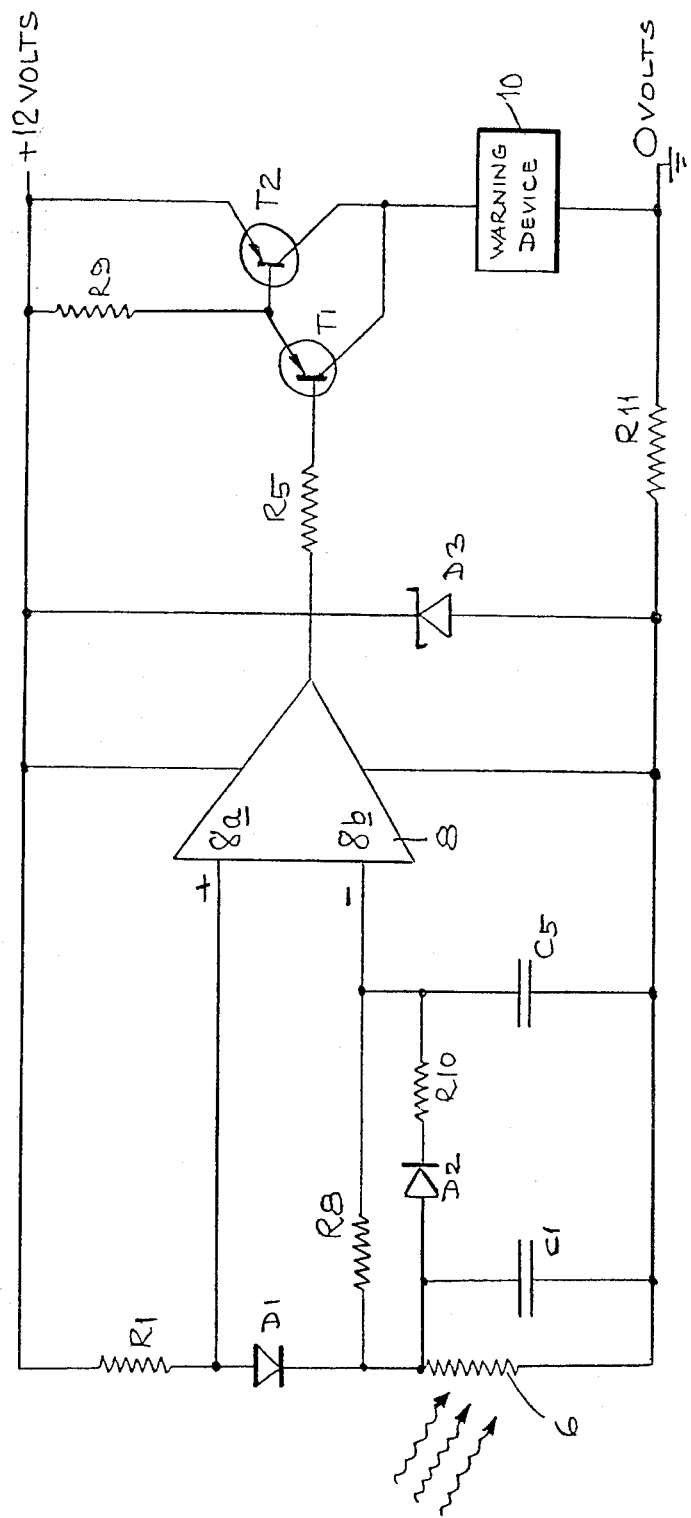
FIG. 4 illustrates a circuit diagram of a control system of another embodiment of the invention.

FIG. 4 illustrates a circuit diagram of a control system of another embodiment of the invention, in which the output of comparator 8, comprising an operational amplifier operated as a Schmitt trigger, is connected directly through a current-limiting resistor R5 to switching transistor T1, which in turn controls a second switching transistor T2. The collector circuit of the transistor T2 includes the warning device 10.

The comparator 8 has two inputs 8a and 8b connected to respective junction points in a potential divider connected across the D.C. power supply. The potential divider comprises a photocell 6, in this case a photo-resistive element, a resistor R1 and a diode D1, the latter being connected across the two comparator inputs 8a and 8b. The diode D1 conducts in its forward direction the voltage across the diode D1 is 0.4 volts. Thus under static conditions, without alteration in the illumination of the photocell 6, the input 8a of the comparator 8 will be at a potential 0.4 volts higher than the input 8b. The comparator input 8b is connected to the junction point of diode D1 and photocell 6 through a resistor R8, the input 8b being also connected directly to the negative supply line (earth) through a capacitor C5.

When the photocell 6 is illuminated by the headlights of an approaching vehicle the sudden increase in the light level will cause a voltage drop at the input 8a of the comparator 8, while the voltage at the input 8b will remain substantially unchanged because the integrating action of resistor R8 and capacitor C5 will allow only a slow change in the voltage at input 8b. If the sensed increase in light level is sufficiently large and rapid to cause a drop in the voltage on the input 8a of more than 0.4 volts relative in input 8b then the output potential of the comparator 8 will switch over from a voltage near that of the positive supply rail to a voltage near the negative supply rail.

When the comparator output voltage drops to a voltage near that of the negative supply rail (0 volts) it forward-biases transistor T1 which in turn forward-biases transistor T2, supplying current to the warning device 10 to energize the latter.

If the increase in light falling on the photocell 6 is now removed (due, for example, to the approaching vehicle having passed by) the voltage on the input 8a of the comparator 8 will rise to its original potential, which is higher than that on the input 8b. This causes the output of the comparator 8 to switch back to a voltage near the positive rail potential, switching off or reverse-biasing transistor T1 and, in turn transistor T2, thereby switching off the warning device 10.

The resistor R9 across the base-emitter of transistor T2 ensures complete switching-off of transistor T2.

A resistor R10 is connected in series with a diode D2 in parallel with resistor R8. The diode D2 is forward-biased while the capacitor C5 is charging (that is, when the circuit is adjusting to darkness) and reverse-biased when capacitor C5 is discharging (that is, when the circuit is adjusting to lightness). Consequently the circuit adjusts to darkness faster than it adjusts to an increase in the sensed light level.

A capacitor C1 connected across the photocell 6 suppresses the effects of lightning and rapid transients, including AC component voltages.

A Zener diode D3 and a resistor R11 form a substantially stable power supply for the sensing circuit, cushioning it from variations likely to occur in practice in the supply voltage.

Figure 5:
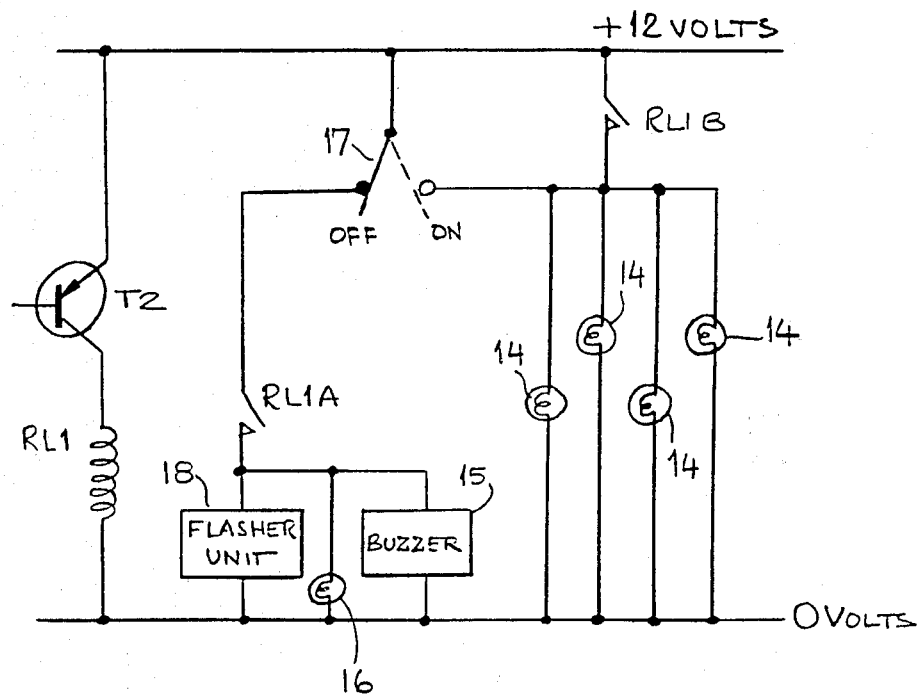
FIG. 5 illustrates a variant applicable to the circuits shown in FIGS. 1 and 4.

As an alternative, or in addition to the warning lamps 14, the warning device 10 may include an energizing circuit for a buzzer 15 and a dashboard warning lamp 16 corresponding to the previously mentioned lamp 11 of the vehicle instrument panel. Such a circuit variant, which is applicable to the circuits of FIGS. 1 and 4, is illustrated in FIG. 5.

The control system in this variant, includes a relay RL1 having two associated normally open relay switches RL1A and RL1B. The relay switch RL1A is connected in series with the buzzer 15 which is in parallel with a flasher unit 18, arranged to switch vehicle hazard warning lights on and off periodically. The hazard warning lights would usually be constituted by the direction indicator lights of the vehicle (not shown). The relay switch RL1B is connected in series with the side lights and rear lamps 14 of the vehicle, and in parallel with a two-way manual selective switch 17. When the selector switch 17 is in the 'OFF' position shown by full lines, the power supply is connected to the relay switch RL1A, while when the switch 17 is in the 'ON' position shown by broken lines, the relay switch RL1A is isolated and the relay switch RL1B is shunted, switching on the vehicle lamps 14 while isolating the buzzer 15 and warning lamp 16. Thus the buzzer 15 and lamp 16 are not energized if the vehicle lamps 14 are already switched on by the switch 17.

This arrangement provides the driver with an audible and visual warning if driving at night without the vehicle lamps 14 switched on. Upon detecting the lights of an approaching vehicle at night the system is activated to cause the light of the vehicle on which the system is fitted to be illuminated, since the instantaneous light intensity will then differ sufficiently from the average light level detected at the photocell 6.

An alternative use of a control system according to the invention would be to control a light on a road obstacle, such as a bollard, and particularly a temporary road obstacle, at night. The light may then be battery powered and the battery should last considerably longer than if used to power a light throughout the night.

I claim:
1. A light activated control system comprising:
a comparator circuit having first and second inputs;
photoelectric ambient light sensing means;
means connecting the sensing means to the first comparator input to provide a signal voltage level at said input representative of the instantaneous output of the sensing means;
capacitive means connected to the second comparator input and to the sensing means for averaging continuously the output of the sensing means to provide at said second input a continuously varying reference voltage level;
triggering means connected to the output of the comparator circuit, and
warning means connected to the triggering means and controlled by the comparator means through the triggering means, whereby the warning means are triggered into operation by the triggering means when the light intensity at the sensing means increases at a rate such that the said signal voltage level exceeds the said reference voltage level, to cause operation of the warning means.

2. The system defined in claim 1, including a series resistor connected to the second comparator input, said capacitive means being charged by the output of the sensing means through said series resistor, and a diode and further resistor connected in series with each other across said series resistor in the charging path of the capacitive means, said diode being forward-biassed by the output from the sensing means corresponding to a decrease in ambient light intensity.

3. The system defined in claim 1 or claim 2, wherein said sensing means comprise a photoresistive element and the means connecting said sensing means to the first comparator input include a diode in series with the photoresistive element and with the first comparator input to maintain the first comparator input at a predetermined potential relative to the second comparator input in the quiescent state of the system, while enabling rapid response of the first comparator input in the event of illumination of the photoresistive element.

4. The system defined in claim 1 or 2, including a capacitive shunt connected to the output of the sensing means to exclude from said sensing means output transient signals resulting from rapid changes in ambient light intensity at alternating current mains frequency and higher frequencies.

* * * * *